United States Patent [19]
Klem et al.

[11] 3,794,837
[45] Feb. 26, 1974

[54] DEVICE FOR DETERMINING THE POSITION COORDINATES OF A LIGHT-IMPULSE EMITTING POINT

[75] Inventors: Adrianus Klem, Delft; Hugo Vlasbloem, Maasland, both of Netherlands

[73] Assignee: N.V. Optische Industrie De Oude Delft, Delft, Netherlands

[22] Filed: Apr. 10, 1972

[21] Appl. No.: 242,659

[30] Foreign Application Priority Data
Apr. 13, 1971  Netherlands.................... 7104844
June 17, 1971  Netherlands.................... 7104304

[52] U.S. Cl. .................................... 250/366
[51] Int. Cl. ................................. G01t 1/20
[58] Field of Search ..................... 250/71.5 S

[56] References Cited
UNITED STATES PATENTS
3,329,814   7/1967   Anger............ 250/71.5 S X
3,432,660   3/1969   Anger............ 250/71.5 S
3,684,886   8/1972   Muehllehner..... 250/71.5 S Primary Examiner—Archie R. Borchelt
Attorney, Agent, or Firm—Arthur B. Colvin

[57] ABSTRACT

A device for determining the position coordinates of a scintillation on the anode screen of an image intensifier tube, which forms part for instance of a gamma camera containing five photomultipliers, four of which being mounted in a square that is centred on the axis of the fifth, the difference of the voltages of two multipliers divided by the voltage of the fifth multiplier being used as signal representative for one position coordinate, filters of which the transmittance varies over the surface being applied to the fifth photomultiplier and the anode screen to compensate for distortion and vignetting of the image on the anode screen.

2 Claims, 2 Drawing Figures

DEVICE FOR DETERMINING THE POSITION COORDINATES OF A LIGHT-IMPULSE EMITTING POINT

The invention relates to a device for determining the position coordinates of a light-impulse emitting point on an anode screen of an image intensifier tube which forms part of a gamma camera containing at least five photomultipliers four of which are positioned at the corners of a square that is centred on the axis of symmetry of the anode screen and the fifth is coincident with said axis of symmetry, the said photomultipliers being connected with a circuit for processing the output voltages of the photomultipliers to derive voltages that are representative of the position coordinates, and an impulse-height discriminator circuit fed with a signal that is representative of the brightness of the light-impulse emitting point starting the processing circuit in case the amplitude of signal falls in a predetermined range of values.

Known devices of this kind are used in gamma cameras comprising a layer of NaI crystals which are separated from one another by gamma ray absorbing and light reflecting walls, one side of which faces a gamma ray source and the other a cathode. This cathode forms part of an image intensifier tube on the anode screen of which an image can be observed. In many cases this anode screen is followed by a number of image intensifier tubes interconnected by optical fibers. A scintillation in one of the crystals of the layer of NaI crystals has the effect that the part of the cathode opposite said layer emits electrons.

In order to obtain signals that are representative of the coordinates of a light-impulse emitting point on the anode screen the image of which is observed, e.g. to reproduce the point on the screen of a cathode ray tube, the difference of the output voltages of some photomultipliers divided by the sum signal of the output voltages of all the multipliers is derived. The sum signal is also fed to an impulse-height discriminator circuit to determine whether the impulse-height falls within a range of values which is of interest.

Problems arise from the known fact that a system of image intensifier tubes introduces distortion and vignetting, having the effect that the relative position of light-impulse emitting points on the anode screen do not have the same relative position as the NaI crystals in which scintillations took place.

To overcome these problems the device according to the invention is characterized in that the circuit for processing the output voltages of the photomultipliers determines the difference of the output voltages of two photomultipliers positioned diametrically opposite each other divided by the output voltage of the fifth photomultiplier, the output voltage of the fifth photomultiplier being fed to the impulse-height discriminator circuit, a first filter being applied to the cathode of the fifth photomultiplier, over the surface of which the transmittance varies as function of the distortion of the image on the anode screen, a second filter being applied to the anode screen, over the surface of which the transmittance varies as function of the vignetting of the image on the anode screen and as function of the transmittance of the first filter in such a way that the fifth photomultiplier gives substantially the same output voltage for points anywhere on the anode screen with the same brightness after correction for the vignetting, a lense being positioned between the anode screen and the fifth photomultiplier to form the image of said screen on the cathode of said fifth photomultiplier.

In the practical case that the distortion of the image on the anode screen is represented by the function $(1 \pm br^2)$, in which r is the distance of a point on the screen to the centre of the screen and b a system constant and the vignetting by the function $f(r)$, the transmittance of the first filter varies as $a(1 \pm br^2)$ and the transmittance of the second filter as $1/f(r)/a(1 \pm br^2)$, $a$ being a constant and r being measured from the centres of the filters.

The invention will be described for an embodiment as shown in the drawings.

Figure 1:
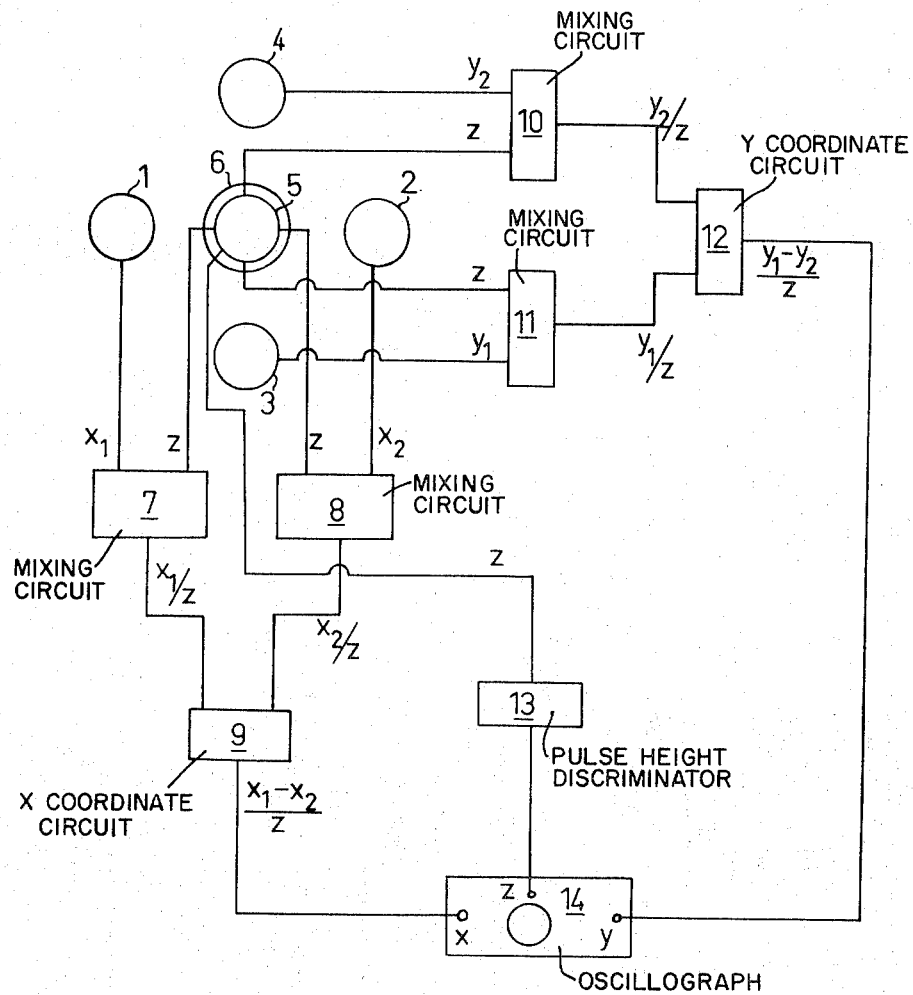
FIG. 1 shows schematically the device according to the invention.
Figure 2:
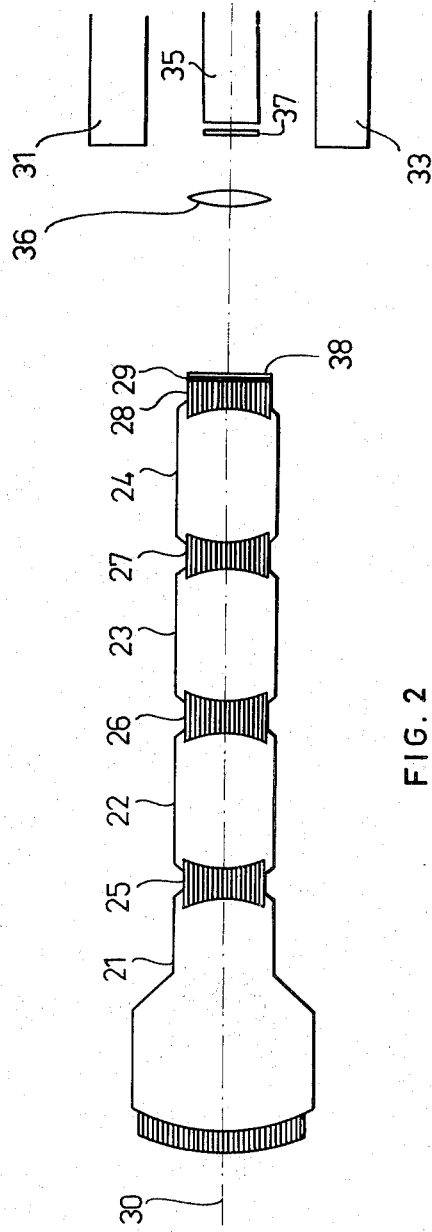
FIG. 2 shows more in detail the positioning of the filters and the lense.

FIG. 1 shows the positioning of five photomultipliers 1, 2, 3, 4 and 5 with respect to the anode screen 6 of, say, an image intensifier tube forming part of a gamma camera. This gamma camera contains a layer of NaI crystals in which an incident gamma quantum produces a scintillation. This scintillation has the effect that, from a cathode positioned under the said layer of NaI crystals, electrons are liberated which, under the influence of an electric field, are thereupon carried to an anode screen on which an impact can be observed as a point emitting a light-impulse. This light image is then increased in intensity by a plurality of image intensifier tubes which are coupled with each other and with the anode screen by means of fibre optics. The anode screen 6 in the figure is in this case the screen of the last image intensifier tube. In order to obtain signals that are representative of the X coordinate and Y coordinate of a light-impulse emitting point on the screen, e.g. in order to reproduce the point as an image on the screen of a cathode ray tube, the measuring signal $X_1$ of the photomultiplier 1 and the measuring signal Z of the photomultiplier 5 are fed to a circuit represented by the block 7 which gives as output signal the signal $X_1/Z$. Similarly, from signals $X_2$ and Z, signal $X_2/Z$ is formed by the circuit represented by block 8. The two signals are thereupon fed to a circuit represented by block 9, which gives an output signal $X_1 - X_2/Z$ that is representative of the X coordinate of a light-impulse emitting point on screen 6. In a similar manner, from signals $Y_1$, $Y_2$ and $Z_1$ emanating respectively from the photomultipliers 3, 4 and 5 via the circuits represented by blocks 10, 11 and 12 respectively, the signal $Y_1 - Y_2/Z$ is formed which is representative of the Y coordinate of the light-impulse emitting point on screen 6.

Furthermore, signal Z of the photomultiplier 5 is fed to an impulse-height discriminator 13 in order to reproduce these points as images on the screen of the cathode ray oscillograph 14, whose intensity lies between predetermined limits.

It will be clear that within the impulse-height region transmitted by the discriminator 13, the coordinates of a point emitting a light-impulse are unequivocally determined by the fact that the deonominator and numerator of, for instance, $X_1 - X_2/Z$ vary in the same ratio as the variation of the intensity of the light-impulse emitting point on the anode screen.

It is, of course, possible to determine the signals $X_1/Z$ etc. by first forming the signal $1/Z$ and then the product signals $X_1/Z$, or by first forming $X_1 - X_2$ and then the desired values $X_1 - X_2/Z$.

In FIG. 2 21, 22, 23 and 24 represent image intensifier tubes interconnected by optical fibers 25, 26, 27. The distorted and vignetted image can be observed on the anode screen 29 at the end of the fiber optics 28. Four photomultipliers from which two are shown, 31 and 33 are placed at the corners of a square, the photomultiplier 35 is placed along the axis of symmetry 30 of the anode screen 29. In order to obtain a signal that is representative of e.g. the Y-coordinate of a light-impulse emitting point on the anode screen 29 the difference of the output voltages $Y_1$ and $Y_2$ of the photomultipliers 31 and 33 is divided by the output voltage Z of photomultiplier 35 $Y_1 - Y_2/Z$. The not shown photomultipliers 32 and 34 provide the signal representative of the X coordinate $X_1 - X_2/Z$.

In the shown embodiment an accumulation of vignetting and distortion up to an amount of 20 percent may take place. In order to obtain a good functioning of the gamma camera it is necessary to compensate for these influences. In this embodiment the distortion is compensated for by influencing the Z-value in the quotient $Y_1 - Y_2/Z$ or $X_1 - X_2/Z$. In that case the value of the quotient changes which can be carried out such that a correction of the distortion is obtained.

The influencing of the Z-value is carried out by forming the image of anode screen 29 on the cathode of photomultiplier 35 by means of the lens 36, a filter 37 being placed adjacent the cathode of photomultiplier 35, the filter having a rotational symmetric density variation. In order to obtain a significant impulse-height discrimination it is necessary that for each point on the anode screen 29 the proper value of the keV-value of the primary gamma quant can be traced. The vignetting of the image on the anode screen however prevents this. In order to compensate for this effect an anti-vignetting filter 38 is applied to the anode screen 29, which filter also has a rotational symmetric density variation to supply the photomultiplier 35 with signals having for any point on the anode screen the same relation as the original gamma quanta entering the layer of NaI crystals. The five photomultipliers being influenced in the same way, the anti-vignetting filter 38 does not influence the compensation of the distortion.

The filters are manufactured as described hereafter.

In the embodiment shown, without the filters, the distortion is measured. Based on the values measured a filter 37 is constructed which filter ter is applied to the cathode of photomultiplier 35. In this arrangement the vignetting $V_z = f(\text{position})$ is measured and from the results the anti-vignetting filter 38 is constructed in order to make the Z-signal independent of the coordinates of the light-impulse emitting point on the anode screen.

What we claim is:

1. A device for establishing with reduced distortion on the display of a gamma camera the position coordinates of a light impulse emitting point on an anode screen of the last of a series of image intensifier tubes, said device comprising at least five photomultipliers, four of said photomultipliers having their cathodes positioned in coplanar alignment at the corners of a square centered on the axis of symmetry of said anode screen, the fifth said photomultiplier being coincident with said axis of symmetry, impulse-height discriminator circuit means operatively connected to the output of said fifth multiplier for initiating a processing circuit responsive to receipt from said fifth photomultiplier of a signal in a predetermined amplitude range, first and second coordinate locator circuit means connected, respectively, to two diametrically opposed photomultipliers and said fifth photomultiplier, said position coordinates being derived in each said locator circuit means by subtracting the output voltages of the two diametrically opposed photomultipliers and dividing same by the output voltage of the fifth photomultiplier, a first variable transmittance filter means positioned to affect the cathode of the fifth photomultiplier only, the transmittance characteristics of said first filter means varying as a function of the distortion of the image on said anode screen, for thus varying transmittance to said cathode to compensate for said anode screen image distortion, lens means for transmitting light from said anode screen and passing through said first filter to said cathode of said fifth photomultiplier, a second variable transmittance filter means disposed over said anode screen, the transmittance of said second filter being selected to vary as a function of vignetting distortion of an image on said anode screen and as a function of the transmittance characteristics of said first filter means, the transmittance values of said first and second filters being coordinated to produce in said fifth photomultiplier an output voltage independent of the position of a light point on said anode screen after correction for vignetting.

2. Device according to claim 1, in which the distortion of the image on the anode screen is represented by the function $(1 \pm br^2)$, in which r is the distance of a point on the screen to the centre of the screen and $b$ a system constant, and the vignetting by the function $f(r)$, characterized in that the transmittance of the first filter varies as $a(1 \pm br^2)$ and the transmittance of the second filter as $1/a(1 \pm br^2)f(r)$ $a$ being a constant and $r$ being measured from the centers of the filters.

* * * * *